US012738295B1

(12) United States Patent
Haapala et al.

(10) Patent No.: US 12,738,295 B1
(45) Date of Patent: Sep. 15, 2026

(54) ANTICIPATORY TRACK SWITCHING MICROACTUATOR TRACK SWITCH TO ENABLE TRACK PROFILE INTERPOLATION AND CONTROL

(71) Applicant: Seagate Technology LLC, Fremont, CA (US)

(72) Inventors: Kenneth Arthur Haapala, Buffalo, MN (US); Reed David Hanson, Chaska, MN (US); Salman Al Saif, Chaska, MN (US); Quiang Bi, Singapore (SG); Chan Fan Lau, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/290,963

(22) Filed: Aug. 5, 2025

(51) Int. Cl.
*G11B 5/55* (2006.01)
*G11B 5/012* (2006.01)

(52) U.S. Cl.
CPC ............ *G11B 5/5547* (2013.01); *G11B 5/012* (2013.01); *G11B 5/5573* (2013.01)

(58) Field of Classification Search
CPC ..... G11B 5/5547; G11B 5/5556; G11B 20/20; G11B 5/54; G11B 5/59633; G11B 5/5539; G11B 5/58; G11B 5/596
USPC .......................................................... 360/75
See application file for complete search history.

(56) References Cited

U.S. PATENT DOCUMENTS

| | | | | |
|---|---|---|---|---|
| 7,119,981 | B2 | 10/2006 | Hanson et al. | |
| 7,215,499 | B1 | 5/2007 | Li et al. | |
| 7,283,321 | B1 | 10/2007 | Sun et al. | |
| 7,548,396 | B2 * | 6/2009 | Higashino ............ | G11B 5/5547 360/78.04 |
| 7,885,033 | B2 | 2/2011 | Hanson et al. | |
| 9,142,234 | B1 | 9/2015 | Lou et al. | |
| 9,741,379 | B1 | 8/2017 | Hanson et al. | |
| 9,911,442 | B1 | 3/2018 | Kharisov et al. | |
| 10,566,017 | B2 | 2/2020 | Yoshikawa | |
| 11,404,084 | B2 | 8/2022 | Koizumi | |

* cited by examiner

*Primary Examiner* — Nabil Z Hindi
(74) *Attorney, Agent, or Firm* — Kagan Binder, PLLC

(57) ABSTRACT

Positioning a transducer over a magnetic recording medium for sequential track seeking operations includes performing a data transfer operation on a current track. During the data transfer operation, a next track is identified for the transducer to be moved in a sequential access pattern and movement of the transducer is initiated toward the next track before completion of the data transfer operation on the current track. A feed-forward control signal is determined based on a feed-forward profile including an acceleration table, which is applied to a microactuator configured to move the transducer by applying a voltage to move the transducer in anticipation of the next track position based on a predefined seek profile, and completing the data transfer operation on the current track during a period of latency in the movement toward the next track, such that a portion of the data transfer and the seek operation overlap in time.

20 Claims, 13 Drawing Sheets

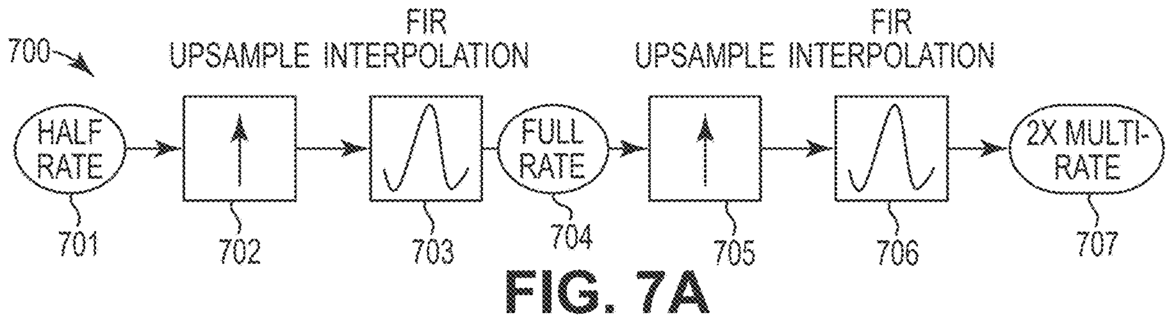
FIG. 7A
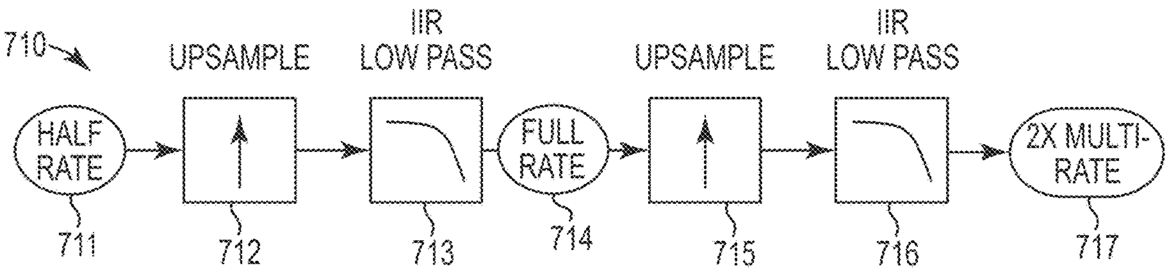
FIG. 7B
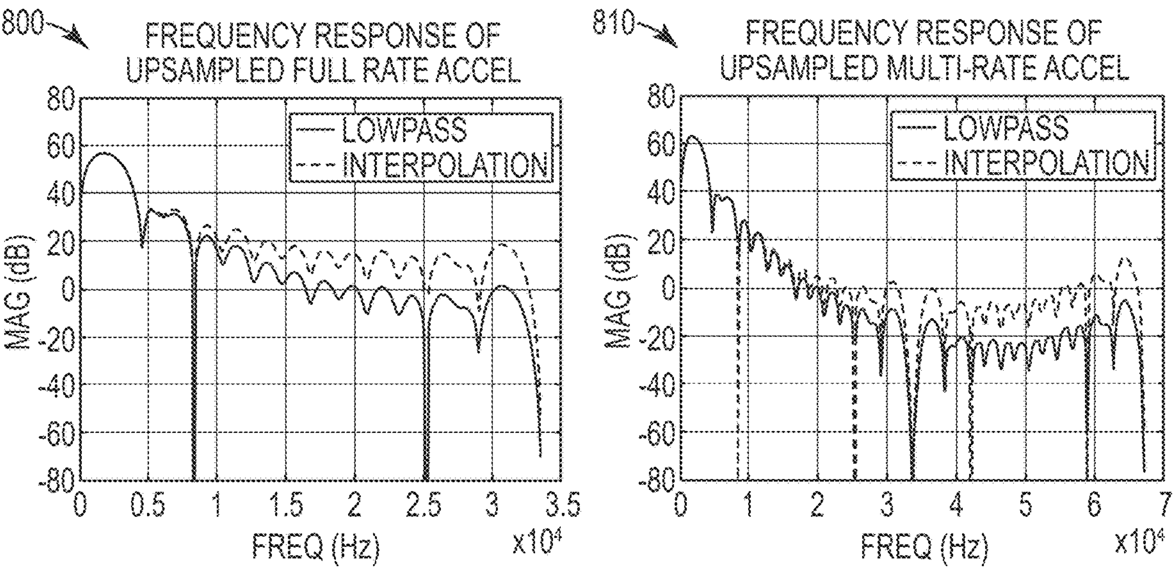
FIG. 8A
FIG. 8B

ANTICIPATORY TRACK SWITCHING MICROACTUATOR TRACK SWITCH TO ENABLE TRACK PROFILE INTERPOLATION AND CONTROL

SUMMARY

A first aspect of the present disclosure is directed to a method for positioning a transducer over a magnetic recording medium for sequential track seeking operations. According to the first aspect, the method includes performing a data transfer operation on a current track of the magnetic recording medium using the transducer. The method also includes, during the data transfer operation, identifying a next track to which the transducer is to be moved in accordance with a sequential access pattern. The method also includes initiating movement of the transducer toward the next track before completion of the data transfer operation on the current track. The method also includes determining a feed-forward control signal based on a feed-forward profile including an acceleration table. The method also includes applying the feed-forward control signal to a microactuator configured to move and/or position the transducer according to the feed-forward control signal, the feed-forward control signal being configured to apply a voltage to move the transducer in anticipation of the next track position based on a predefined seek profile. The method also includes completing the data transfer operation on the current track during a period of latency in the movement toward the next track, such that a portion of the data transfer and a portion of the seek operation overlap in time.

A second aspect of the present disclosure is directed to a data storage device. According to the second aspect, the data storage device includes a disk configured to store data in a plurality of concentric data tracks. The data storage device also includes a head configured to read data from or write data to the data tracks. The data storage device also includes an actuator configured to move the head radially across the disk. The data storage device also includes a control circuit for positioning a transducer over a magnetic recording medium for sequential track seeking operations. According to the second aspect, the control circuit is configured to perform a data transfer operation on a current track of the magnetic recording medium using the transducer. The control circuit is also configured to, during the data transfer operation, identify a next track to which the transducer is to be moved in accordance with a sequential access pattern. The control circuit is also configured to initiate movement of the transducer toward the next track before completion of the data transfer operation on the current track. The control circuit is also configured to determine a feed-forward control signal based on a feed-forward profile including an acceleration table associating discrete voltage values with corresponding microactuator acceleration values. The control circuit is also configured to apply the feed-forward control signal to a microactuator configured to move and/or position the transducer according to the feed-forward control signal, the feed-forward control signal being configured to apply a voltage to move the transducer in anticipation of the next track position based on a predefined seek profile. The control circuit is also configured to complete the data transfer operation on the current track during a period of latency in the movement toward the next track, such that a portion of the data transfer and a portion of the seek operation overlap in time.

A third aspect of the present disclosure is directed to a non-transitory computer-readable medium storing instructions which, when executed by a controller of a data storage device, cause the data storage device to position a transducer over a magnetic recording medium for sequential track seeking operations. According to the third aspect, the track seeking operations include performing a data transfer operation on a current track of the magnetic recording medium using the transducer. The track seeking operation also include, during the data transfer operation, identifying a next track to which the transducer is to be moved in accordance with a sequential access pattern. The track seeking operation also include initiating movement of the transducer toward the next track before completion of the data transfer operation on the current track. The track seeking operation also include determining a feed-forward control signal based on a feed-forward profile including an acceleration table associating discrete voltage values with corresponding microactuator acceleration values. The track seeking operation also include applying the feed-forward control signal to a microactuator configured to move and/or position the transducer according to the feed-forward control signal, the feed-forward control signal being configured to apply a voltage to move the transducer in anticipation of the next track position based on a predefined seek profile. The track seeking operation also include completing the data transfer operation on the current track during a period of latency in the movement toward the next track, such that a portion of the data transfer and a portion of the seek operation overlap in time.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIGS. 7A-7B show examples of signal upsampling and related steps, in accordance with certain aspects of the present disclosure.

FIGS. 8A-8B show example frequency response profiles for magnitude as a function of frequency, in accordance with certain aspects of the present disclosure.

DETAILED DESCRIPTION

Figure 1:
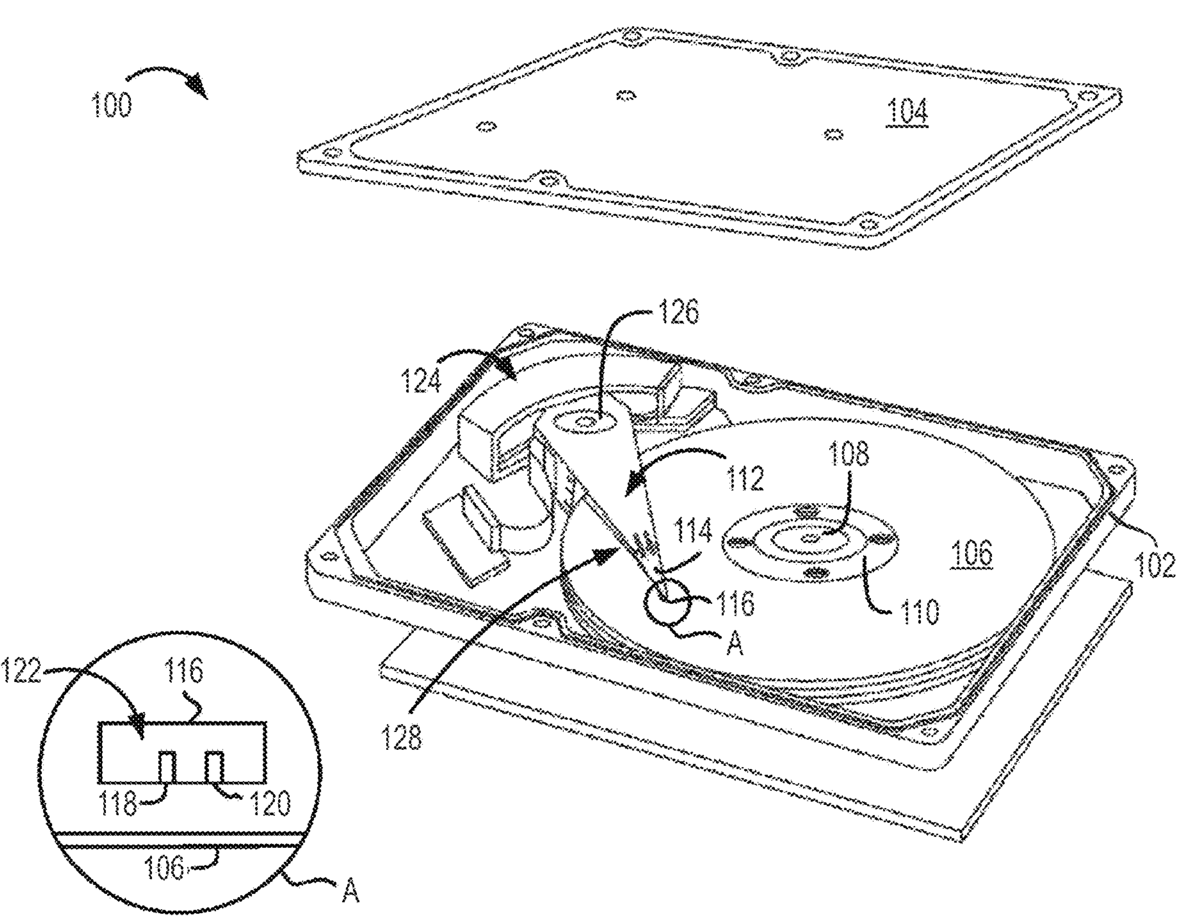
FIG. 1 shows an exploded, perspective view of a hard-disk drive, in accordance with certain aspects of the present disclosure.

The methods and features described herein are applicable to managing actuator positioning and track switching operations in hard-disk drives (HDDs). Accurate and responsive actuator control ensures high data throughput, minimized seek times, and helps maintain reliable access to high-density data storage media. Prior art references, discussed below, have addressed techniques for improving track switching by using both feedback and anticipatory methods.

U.S. Pat. No. 7,885,033 to Hanson et al. discloses a system and method for track switching in an HDD using a voice coil motor (VCM). The system enables anticipatory positioning of the read/write head by employing feed-forward control based on a commanded track jump. Specifically, the VCM receives a feed-forward current input derived from the magnitude and direction of the desired track jump, allowing the system to account for and reduce seek latency. This reference emphasizes the benefits of anticipatory track switching utilizing a VCM current feed forward profile, thereby improving sequential performance and enabling rapid and accurate settling of the read/write head over the target track.

U.S. Pat. No. 9,741,379 to Hanson et al. further develops actuator control techniques by providing a method of anticipatory track switching using profile-based feed-forward signals, including both a microactuator voltage feed forward profile and VCM current feedback control. This reference teaches generating a family of predefined feed-forward profiles, each corresponding to a different track jump magnitude and direction. When a track switch is initiated, a suitable feed-forward profile is selected based on the specific seek operation and applied to the microactuator to reduce overshoot and settle time. The system may also refine the profile selection using real-time or historical operating data to further optimize performance. This approach allows for responsive, low-latency positioning without requiring excessive real-time computation.

The present disclosure builds upon various aspects of actuator control and anticipatory track switching as described in the above U.S. Pat. Nos. 7,885,033 and 9,741,379. In particular, the techniques disclosed herein extend and refine the use of feed-forward profiles and microactuator control based on parametrized acceleration data in combination with upsampled acceleration versus voltage data to further reduce track settling times and improve positioning accuracy under a range of operating conditions. The following description provides exemplary embodiments that enhance or supplement known systems with additional features, optimizations, calibrations, and control logic not previously disclosed.

More specifically, various aspects described herein are directed to using a microactuator-based HDD actuator assembly that uses feed-forward control using acceleration data and integrals of the acceleration data in combination with decimated (acceleration) track data to provide lower on-cylinder limits while preferably at least maintaining track skew levels. Additionally, decimation of acceleration data provides a mechanism to reduce memory usage in an embedded servo control system, while upsampling provides a smoother output to improve tracking performance by avoiding excitation of mechanical modes. As used herein, track skew refers to an angular offset between corresponding tracks on adjacent disk surfaces. Because data is read sequentially across tracks and heads, track skew can account for a time delay caused by actuator and/or disk rotational movement when switching from one track to another on the same head and disk surface. In anticipatory track switching (ATS) calibration, track skew can affect seek timing and control precision, especially in multi-head systems, and should be considered to ensure accurate synchronization and minimal latency during head-to-head seeks. To-date, skew levels have been difficult to reduce due in part to operational overhead, such as controller operations.

In more detail, aspects of the present application are directed to refinements in ATS in microactuator-based HDDs, particularly as relates to on-cylinder limits (OCLims), which have posed challenges to-date. OCLims, in general, decrease when HDD storage capacity increases, e.g., via a lower track pitch. Prior implementations of ATS have faced challenges in attempting to meet lower OCLim requirements. Notably, it has been observed that a given OCLim and track pitch are substantially proportional. In an example implementation, a OCLim can be specified in a given design as 10-15% of the track pitch. An OCLim can also refer to write fault threshold or a seek overshoot control limit. In general, a goal of ATS is the achieve a fast sequential seek, while meeting various operational requirements. Lowering a seek trajectory repeatable runout (STRRO) and/or the tracking position error signal (PES) can also result in lowering the OCLim in an HDD, tightening the tolerance for considering the head "on track," which can improve servo precision and reduce the risk of off-track writes. The above can be especially important for higher-density recording. Lowering the OCLim, as discussed above, can therefore enhance data integrity and reliability, e.g., based on better actuator accuracy or tuning. More specifically, lowering OCLim can beneficially lead to lower data track pitch and in turn higher areal density and increased drive capacity.

Figure 14:
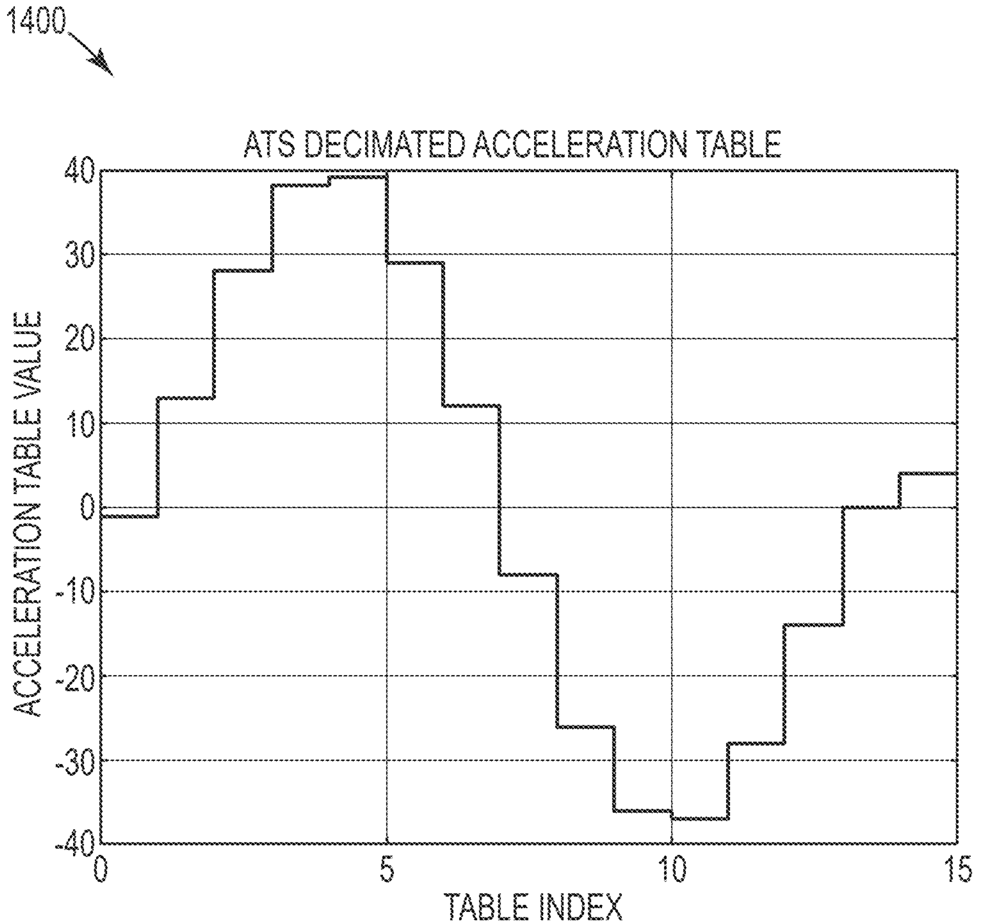
FIG. 14 shows an example decimated acceleration table, in accordance with certain aspects of the present disclosure.

The present application addresses these challenges in the art by providing methods and structures for ATS profile tuning to meet an ATS STRRO threshold (e.g., an ATS STRRO of about 10% to about 20% of the applicable OCLim, or about 1% to about 2% of the applicable track pitch) while minimizing seek time and sequential format skew. Specifically, a microactuator feed-forward profile can be parametrized using an (e.g., decimated, then upsampled) acceleration table vs. time (e.g., as shown at reference numeral 1400 of FIG. 14). As shown, the acceleration table 1400 shows an example of 15 total 8-bit values versus a table index. This acceleration table 1400 shows corresponding data to the upsampled, scaled, and filtered representation shown in the smoothed curve of FIG. 5. The acceleration table can be used for control of the feed-forward signal to the microactuator (e.g., 128). As shown, the table 1400 on the X-axis shows a table index of 0-15 points, or 16 total points. These 16 points can represent a downsampled, "decimated" representation of a higher-resolution signal. The Y-axis, shows acceleration table values from about −40 to about 40, which can represent acceleration commands or feed-forward correction values in arbitrary units. As shown, the table 1400 includes a graph with a piecewise-constant, stair-step form.

As shown, the graph starts near 0 at index 0, then rises steadily to a peak of about 40 at index 5, then falls into a symmetric negative dip, reaching a minimum of about −40 at index 10, then rises back toward 0 at index 15. It is understood that the acceleration table 1400 could alternatively be represented by any data structure, such as a two-column table with table index and acceleration table value columns and 16 rows for the 16 table index values, and corresponding values therein.

Figure 3:
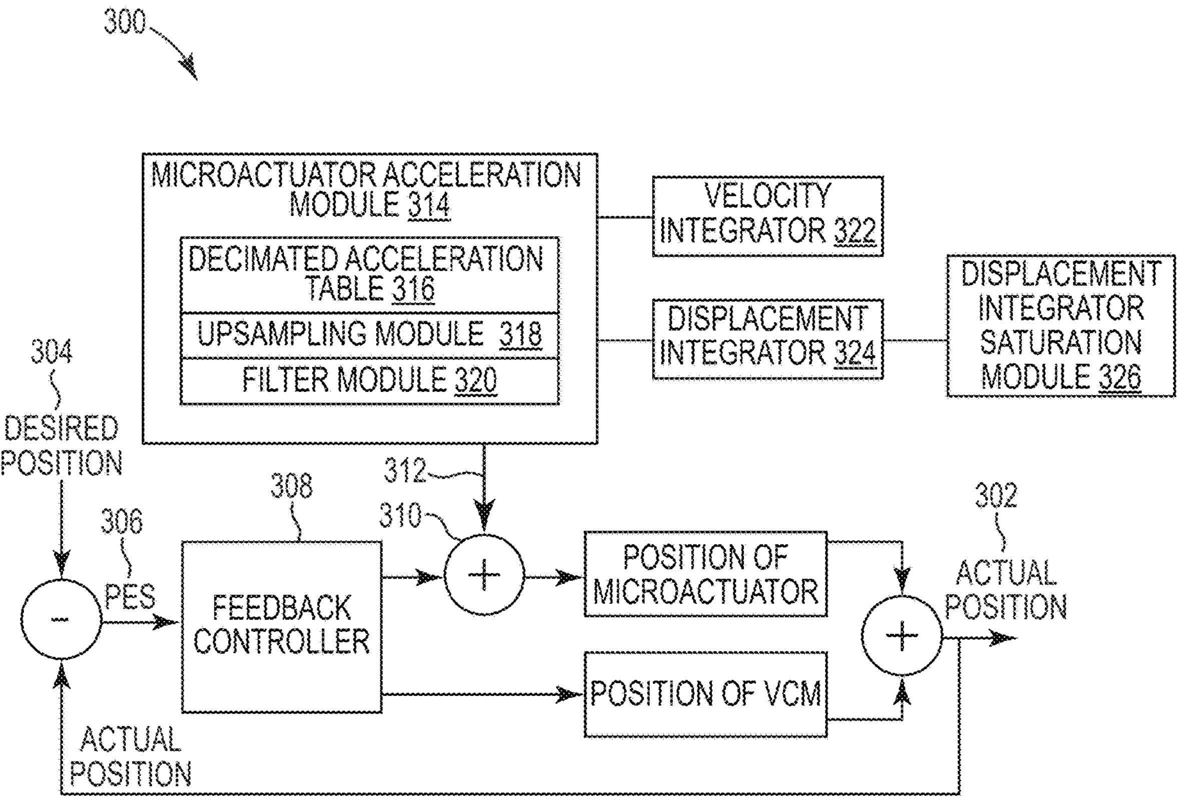
FIG. 3 shows a diagram of an actuator servo control system, in accordance with certain aspects of the present disclosure.

An embedded control algorithm, e.g., embodied in servo control system 300 of FIG. 3, preferably provides features to perform the upsampling, integration to velocity and displacement and minimize microactuator windup and digital-analog converter (DAC) saturation during calibration and drive operation. For instance, a double integral of the acceleration table values shown in FIG. 14, can be used to generate the upsampled, smoothed, acceleration plot 512 of FIG. 5. The acceleration table values can give head displacement values scaled to microactuator DAC voltage.

The disclosed implementations provide for constraints on the feed-forward profile to substantially ensure both the final acceleration and final velocity are both zero. The constraints can be applied either in a calibration procedure or in the real time embedded firmware algorithm (or both) of the servo control system 300. For example, the present disclosure includes a deceleration pulse over a period of time to drive a final velocity to zero, (for example, with 32 samples) with an amplitude determined by the real-time embedded control algorithm. The deceleration pulse is also preferably upsampled and filtered to obtain a smoothed output. As described in greater detail below, parameterization allows for factory calibration using model-based iterative learning control (ILC), such as inverse model-based ILC. The result allows for lowering the OCLim while maintaining the track skew from previous iterations. Thus, as disclosed herein, a microactuator acceleration profile can be provided with zero velocity features and saturation mitigation or avoidance to beneficially enable ILC-based ATS calibration. Of note and in various embodiments, VCM current calibration may not be subject to saturation since the VCM current may not have saturation for small signals (e.g. one track seeks).

As an example, FIG. 1 shows an exploded, perspective view of a hard-disk drive (HDD) 100 having a base deck 102 and top cover 104. The HDD 100 includes magnetic recording platters 106 coupled to a spindle motor 108 by a disk clamp 110. The HDD 100 also includes an actuator assembly 112 coupled to a suspension assembly 114 that suspends read/write heads 116 (only one read/write head 116 is shown in FIG. 1) over the magnetic recording, media platters 106. As shown in inset A, a close-up view of the read/write head 116 positioned above the magnetic recording platter 106, the read/write head 116 may include multiple transducers, including write elements 118 that write data to data tracks of the magnetic recording platters 106 and read elements 120 that read data from the data tracks (hereinafter the write and read elements 118, 120 are referred to interchangeably as the transducer 122). In operation, the spindle motor 108 rotates the magnetic recording platters 106 while the actuator assembly 112 is controllably driven by, e.g., a VCM assembly 124 that rotates the actuator assembly 112 around a pivot bearing 126. The actuator assembly 112 also includes at least one microactuator 128 (or multiple sets of microactuators in tandem, as shown in FIG. 2D) positioned at least partially on or between the suspension assembly 114 and the read/write head 116. The HDD 100 further includes a servo control system (e.g., 300 of FIG. 3) that controls the VCM assembly 124 and the microactuator 128 to position the read/write heads 116 (and therefore the transducer 122) over a desired track on the magnetic recording platters 106 for reading and writing operations.

Figures 2A, 2B, 2C:
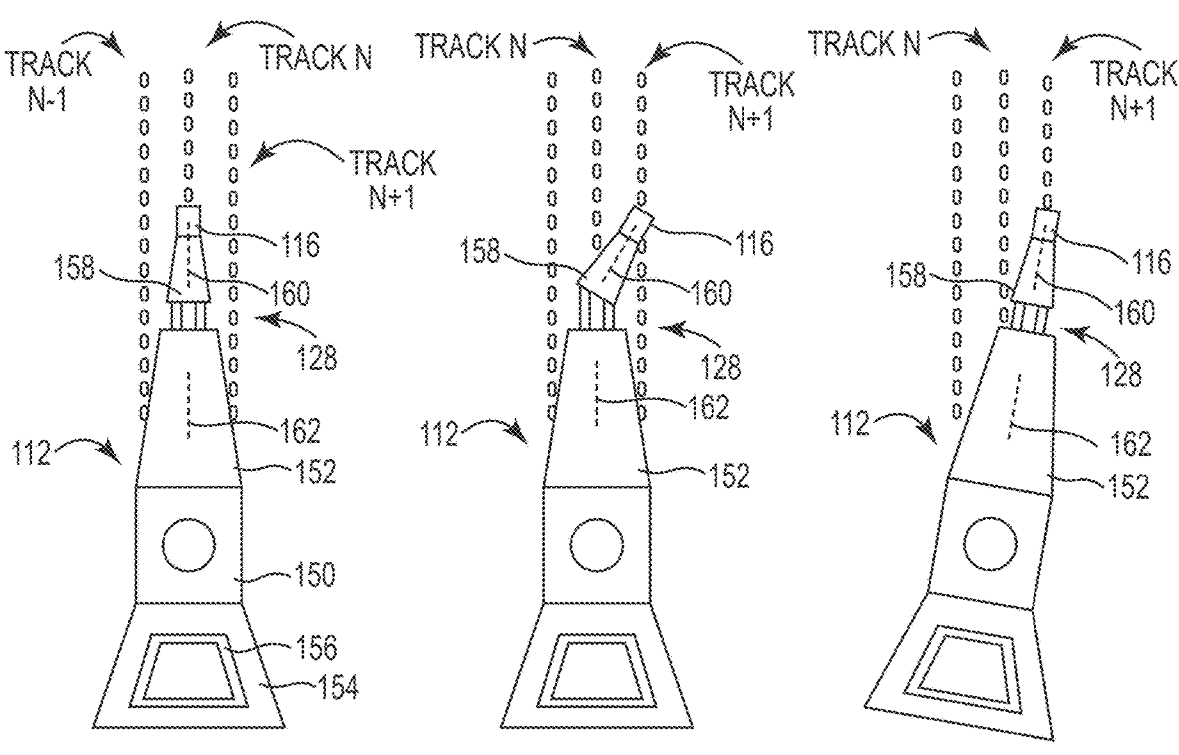
FIGS. 2A-2C show a top, schematic view of an actuator assembly of the hard-disk drive of FIG. 1.
Figure 2D:
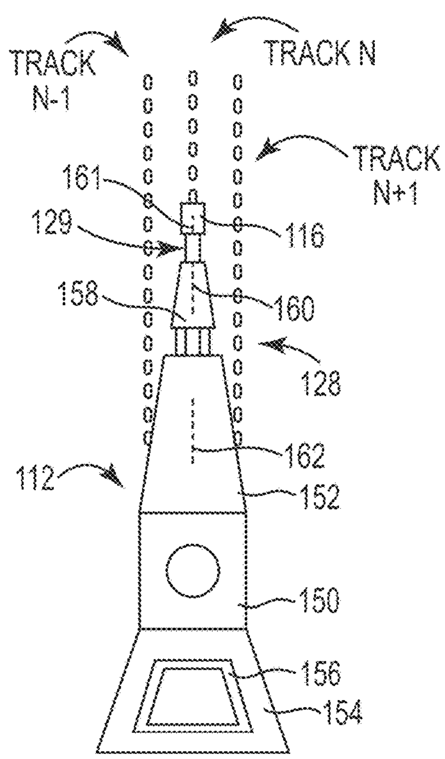
FIG. 2D shows a schematic of an alternative actuator assembly of the hard-disk drive of FIG. 1.

FIGS. 2A-2C show a top, schematic view of an actuator assembly 112 with a single microactuator configuration at various positions and time periods before, during, and after a track seeking operation where the transducer 122 is transitions from one track to another. The actuator assembly 112 has an actuator body portion 150 from which a plurality of arms 152 (only the top arm is shown in FIGS. 2A-2C) and a voice coil shelf 154 extend from the actuator body 150. The voice coil shelf 154 is coupled to a voice coil 156, which may include a wound conductive wire through which current is applied. In operation, positioning of the actuator assembly 112 is controlled by the applied current through the voice coil 156 which generates a magnetic field that interacts with magnetic fields of permanent magnets (not shown) of the VCM assembly 124 and that are spaced apart from the coil 156. The arm 152 is shown as being proximal to the actuator body portion 150 and coupled to a suspension 158 (distal to the actuator body portion 150) by the microactuator 128.

However, it is appreciated that the at least one microactuator 128 may be positioned anywhere on or between a read/write head 116 and the actuator body portion 150. For example, the at least one microactuator 128 may be positioned between the suspension 158 and a read/write head 116. In certain embodiments, the suspension 158 is separated into multiple sections and at least one microactuator 128 may be positioned between the multiple sections. In other embodiments, multiple microactuators 128 (e.g., sets or pairs thereof) are provided, e.g., to provide multiple levels of precision or movement. Thus, the actuator assembly 112 may include multiple sets/pairs of microactuators 128 configured to move various parts of the actuator assembly 112. For example, the HDD 100 may utilize a dual, triple, or more-stage actuation system, which may refer to a number of actuation systems (e.g., VCM assembly, microactuators, milliactuators, etc.) used by the HDD 100 to position the transducer 122. In various embodiments, the term "milliactuators" can refer to an, e.g., second set of microactuators in distinction with a first set of "microactuators." In some examples, the milliactuators can be smaller than the microactuators, although the microactuators and milliactuators can optionally be substantially similar in size. The suspension 158 is coupled to the read/write head 116.

In more detail, the VCM assembly 124 (including the voice coil 156) and microactuator(s) 128 are arranged to carry out various positioning operations (e.g., track seeking, track settling, track following) that position the read/write heads 116 (and therefore the transducer 122) over a desired track (e.g., N−1, N, N+1) of the magnetic recording platter 106 to read data from or write data to the desired track of the magnetic recording platter 106. For example, in response to a command to read data from or write data to a track different from where the transducer 122 is currently positioned (i.e., a track seeking operation), a current may be applied to the voice coil 156 of the VCM assembly 124 to rotate the actuator assembly 112 (and therefore the transducer) towards the desired track. As the transducer 122 nears the desired track, the microactuator(s) 128 may be activated to assist the VCM assembly 124 with settling over the desired track (i.e., a track settling operation). For example, the microactuator(s) 128 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot. FIG. 2B, discussed in more detail below, shows an example of the read/write head 116 pivoting in response to voltage being applied to the microactuator(s) 128. Once the transducer 122 is positioned over the desired track, the microactuator(s) 128 may be used to compensate for small positioning errors to keep the transducer 122 over the desired track (i.e., a track following operation).

As discussed above, FIGS. 2A-2C show microactuator track switch seek phases using a load beam piezoelectric microactuator. Also contemplated are other locations for microactuators, such as head/gimbal-mounted microactuator(s) 129. FIG. 2D depicts an embodiment in which both a load beam microactuator 128 and a head/gimbal mounted microactuator 129 are used for a track switch seek. It will be understood herein that one or both of microactuators 128, 129 in various embodiments can be used singly or in tandem for various microactuator track switch seeks and the like, and that each microactuator can have a separate or combined profile in accordance with the present disclosure. Optionally, the microactuators 128 can be so-named, and the microactuators 129 can be referred to as milliactuators. Furthermore, for clarity and consistency herein, usage of microactuator(s) 128 below can refer to any microactuator (e.g., microactuator 129) of the actuator assembly 112, whether provided with one set, two sets, three sets, four sets, or any number of sets of microactuators.

FIG. 3 provides a high-level representation of a servo control system 300 in accordance with various embodiments. Previous ATS seeks have used a calibration VCM current feed-forward table in the servo adaptive parameters (SAP) in memory. The present disclosure instead implements a decimated acceleration feed-forward table in the SAP memory.

In operation, the read/write heads 116 read servo data (e.g., positioning data) embedded on the magnetic recording platters 106 to determine an actual position 302 of the transducer 122 relative to tracks on the magnetic recording platters 106. The actual position 302 of the transducer 122 is subtracted from a desired position 304 of the transducer 122 to determine a position error signal (PES) 306, which is the difference between where the transducer 122 is and should be positioned. The PES 306 is fed into a feedback controller 308 (which can include a processor operatively coupled to at least a memory), which controls current to the VCM assembly 124 and, for some operations, controls applied voltage to the microactuators 128 based on acceleration data to position the transducer 122 over the desired track. The servo control system 300 includes an adder 310 that injects a feed-forward signal 312 to the microactuator(s) 128 to further control a position of the transducer 122 to the desired track. The feed-forward signal 312 and microactuator acceleration module 314, discussed in more detail below, are useful in assisting with carrying out certain transducer-positioning operations, such as those shown in FIGS. 2A-2C, to accomplish data reading and/or writing operations such as sequential reading and writing operations In various embodiments, sequential instructions can be generated in response from a read or write request from a host interface and can be sent by a controller processor to a servo processor as they are received (or sent from a queue in a controller memory, not shown). The microactuator acceleration module 314 preferably replaces previously-used voltage profiles for microactuator control. The acceleration module 314 can include a decimated acceleration table 316 (see also acceleration table 1400 of FIG. 14), an (e.g., 4×, multi-rate) upsampling module 318, and a filter module 320. A velocity integrator 322 and a displacement integrator 324 can be in operative communication with the acceleration module 314, which are described in greater functional detail herein. A displacement integrator saturation module 326 can further be in operative communication with the displacement integrator 324.

FIGS. 2A-2C show the actuator assembly 112 at various time periods during a track seeking operation where the read/write head 116 (and therefore the transducer 122) seeks from a first track N to an adjacent track N+1. Short seek operations may be useful for carrying out sequential read and write operations, which refer to reading or writing data to tracks in a contiguous manner. Although FIGS. 2A-2C show the transducer 122 being positioned from a first track (e.g., track N) to an immediately adjacent track (e.g., track N+1), it is appreciated that the disclosure may be useful for seeking operations involving seeks greater than single-track seeks (e.g., track N to track N+10, track N to track N+5, track N to track N−2) on either side of track N.

FIG. 2A shows the read/write head 116 positioned over track N of the magnetic recording medium 106. At this position, the transducer 122 of the read/write head 116 may be reading data from or writing data to track N of the magnetic recording medium 106. FIG. 2A also shows a longitudinal axis 160 of the read/write head 116 being generally aligned or parallel with a longitudinal axis 162 of the arm 152. Similarly, FIG. 2D, depicting two sets of microactuators 128, 129, further shows a third longitudinal axis 161 at the read/write head 116 itself, which can also be aligned or parallel with neither, one or both of the longitudinal axes 160, 162 during various states of operation.

Figure 4:
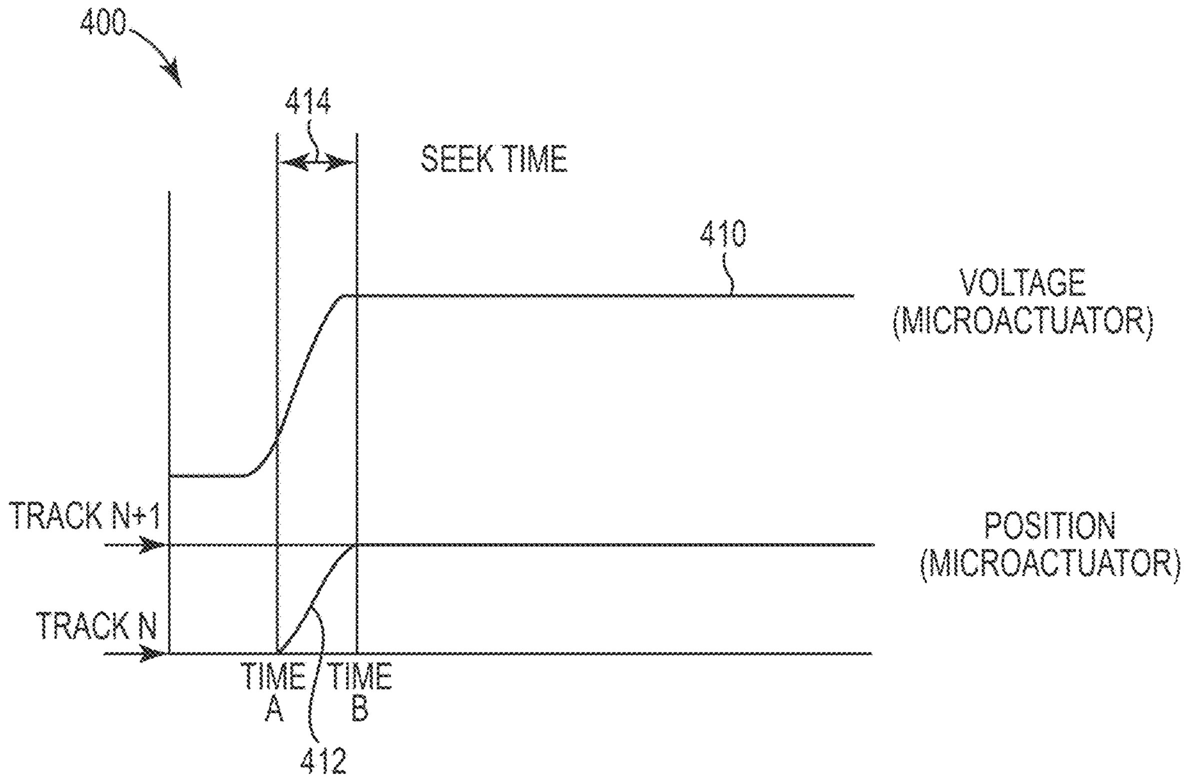
FIG. 4 shows a plot of actuator voltage and position as a function of time, in accordance with certain aspects of the present disclosure.

FIG. 4 is a companion figure for FIGS. 2A-2D and shows a plot 400 of the transducer's position 412 and a voltage 410 applied to at least one of the microactuators 128 over time. Time A on FIG. 4 corresponds to the position of the transducer 122 as shown in FIG. 2A (and therefore FIG. 2D) and the voltage applied to at least one of the microactuators 128 in FIG. 2A. Following Time A, the position of the transducer 122 can move during a duration of time 414 as shown in FIG. 2B and voltage applied to at least one of the microactuators 128 in FIG. 2B. Time B corresponds to the position of the transducer 122 as shown in FIG. 2C and voltage applied to at least one of the microactuators 128 in FIG. 2C. At Time A, FIG. 4 shows that the transducer 122 is positioned over track N and that little to no voltage is being applied to the microactuator 128.

FIG. 2B shows the read/write head 116 (and therefore the transducer 122) positioned over track N+1 of the magnetic recording medium 106. FIG. 4 also shows that, at Time B, the transducer 122 is positioned over track N+1. FIG. 4 shows that during the time period 414 between Time A and Time B, a voltage 410 is applied the microactuator(s) 128 which displaces a position 412 of the transducer 122 such that the transducer 122 is positioned from track N to track N+1. In this manner, the microactuator 128 carries out the single-adjacent-track seeking operation, resulting in a seek operation that is completed quicker than if the VCM assembly 124 was used to position the transducer 122. Utilizing the microactuator(s) 128 to position the transducer 122 independent of the VCM assembly 124 is quicker at least because utilizing the microactuator 128 involves moving less mass (e.g., only the suspension 158 positioned distal of the actuator body portion 150) as compared to positioning the entire actuator assembly 112. Quicker seek times can result in improved data access rates. For example, the HDD 100 may be able to retrieve requested data faster when seek times are reduced. As shown in FIG. 2B, the longitudinal axis 160 of the read/write head 116 may not be inline or parallel with the longitudinal axis 162 of the arm 152 at various stages.

Referring back to FIG. 3, the feed-forward signal 312 represents the positioning signal (and therefore acceleration profile or integral derivation thereof) applied to the micro-actuator(s) 128. For example, FIG. 4 shows a voltage profile 410 in between Time A and Time B that is approximately a straight line where the voltage applied to the micro-actuator(s) 128 is increased at about the same rate, in accordance with acceleration tables (e.g., see 1400 of FIG. 14) and correspondingly derived output voltage values applied to the microactuator(s) 128. Although the voltage profile 410 is shown as having essentially a single sloped section, it is appreciated that other voltage profiles may be used to carry out seeking operations accordingly to, e.g., various integrals of microactuator head acceleration values. The acceleration and resulting voltages to be applied may differ from HDD to HDD and even from head to head within a single HDD. For example, an acceleration table (preferably a decimated acceleration table) for a certain hard drive may be determined by a calibration routine in a factory before the HDD is shipped to a customer (see also FIGS. 11 and 12, below). Acceleration tables may differ from HDD to HDD even though the HDDs go through the same calibration routine. Acceleration tables may also differ depending on the seek operation (e.g., single-track seek, multi-track seek).

While a feed-forward signal is applied to the microactuator(s) 128, the VCM assembly 124 may continue to be positioned by the feedback controller 208, which utilizes the PES 306. For example, once the transducer 122 is positioned over the desired track (e.g., N+1), the feedback controller 308 will act to control a position of the actuator assembly 112 through the VCM assembly 124 by compensating for positioning errors at track N+1 as the feedback controller 308 would normally function.

FIG. 2C shows the read/write 116 positioned over track N+1 of the magnetic recording medium 106. FIG. 2C also shows the longitudinal axis 160 of the read/write head 116 being generally aligned or in parallel with the longitudinal axis 162 of the arm 152. FIG. 4 shows that during the time period from Time B to later, the transducer 122 maintains its position over track N+1. Also, during such time period, voltage applied to at least one of the microactuators 128 is decreased until eventually returning to zero (not visible in FIG. 4). The voltage (and therefore displacement of at least one of the microactuators 128) decreases because the VCM assembly 124 is actuated to rotate the arm 152 (e.g., section proximal the actuator body portion 150) towards track N+1 such that the microactuator(s) 128 no longer needs to be used to position the transducer 122 over track N+1.

It is appreciated that the steps and voltage profiles shown in FIGS. 2A-2C and 4 can be reversed. For example, in anticipation of a command to read data from an adjacent track, a current could be applied to the voice coil 156 to rotate the arm 152 towards the adjacent track while voltage applied to the microactuators 128 is gradually increased such that the microactuators 128 enable the transducer 122 to maintain its position over track N. The voltage applied to the microactuator(s) 128 could be quickly reduced to zero such that the transducer 122 is positioned over the adjacent track N+1.

It is also appreciated that multiple adjacent-track operations, like those described above, can be carried out in parallel. For example, the microactuator(s) 128 and a read/write head 116 positioned on one side of a magnetic recording platter 106 could be performing an adjacent-track operation while a separate microactuator or group of microactuators and a read/write head could simultaneously perform an adjacent-track operation of their own either on the same magnetic recording platter 106 or another magnetic recording platter/media.

It is also appreciated that voltage profiles with discrete voltage values associated with the microactuator acceleration module 314 can be stored in various storage memory circuitry. Moreover, various components and/or functions of the servo control system 300, such as the feedback controller 308, may incorporate firmware and/or microprocessor circuitry, including driver circuitry for the microactuator(s) 128 and the VCM assembly 124.

Figure 13:
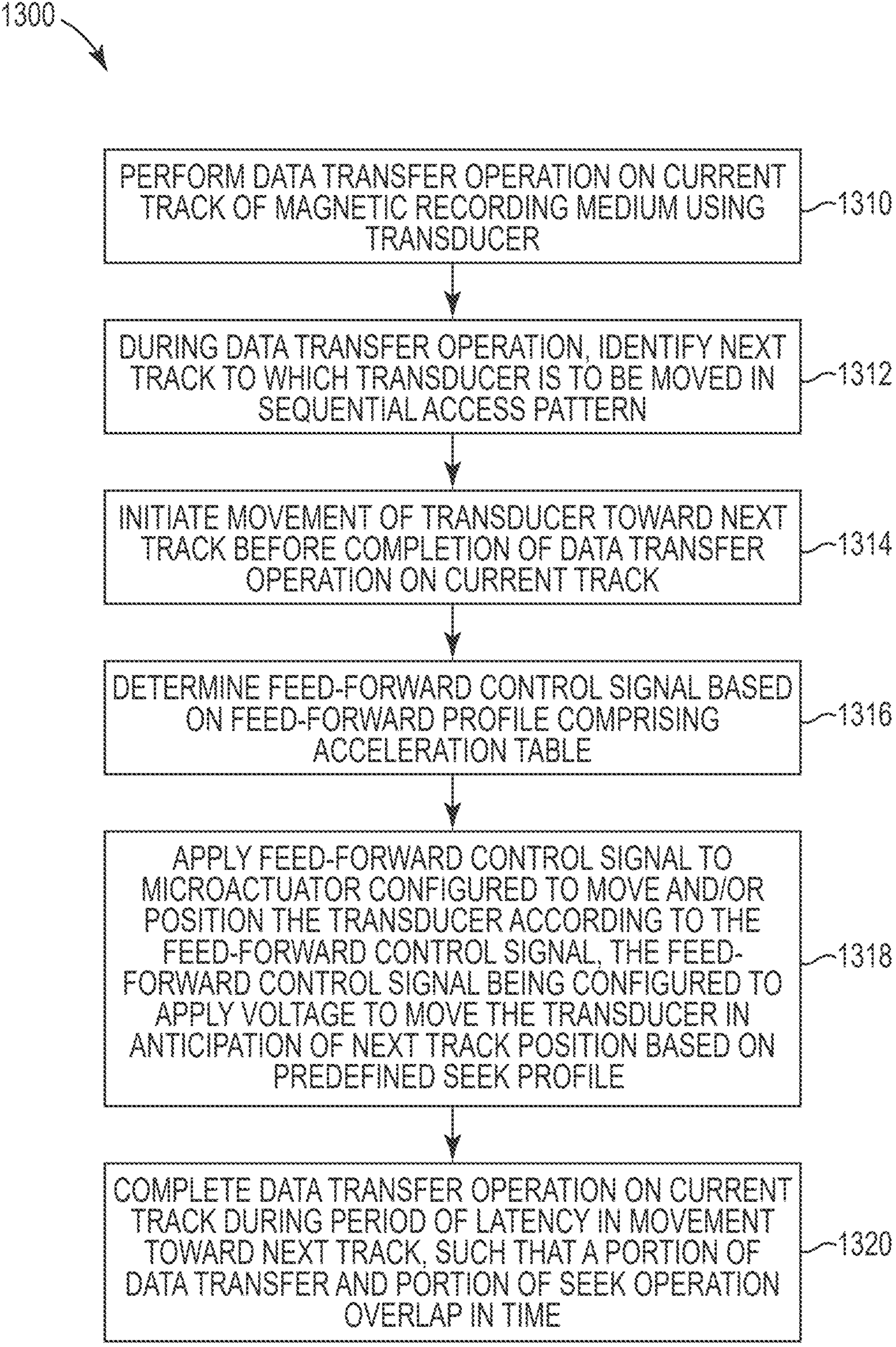
FIG. 13 shows a flowchart of a method, in accordance with certain aspects of the present disclosure.

With reference now to FIG. 13, a flowchart 1300 shows steps of a method for positioning a transducer of a read/write head over a magnetic recording medium for sequential track seeking operations is shown and described. At 1310, the method includes a step of performing a data transfer operation on a current track (e.g., track N) of the magnetic recording medium using the transducer. At step 1312, and during the data transfer operation, the method further includes identifying a next track (e.g., track N+1) to which the transducer is to be moved in accordance with a sequential access pattern. At step 1314, the method also includes initiating movement of the transducer toward the next track before completion of the data transfer operation on the current track. At step 1316, the method further includes determining a feed-forward control signal based on a feed-forward profile including an acceleration table (e.g., 1400 of FIG. 14). In various embodiments, the feed-forward control signal is determined at step 1316 based on the feed-forward profile according to at least one of a) a velocity value determined based on a first integral of an acceleration value of the acceleration table, or b) a position value determined based on a second integral of the acceleration value of the acceleration table. In various embodiments, the acceleration table associates discrete voltage values with corresponding microactuator acceleration values. In various embodiments, the acceleration table is a decimated acceleration table. In various embodiments, the decimated acceleration table is upsampled.

Next, at step 1318, the method includes applying the feed-forward control signal to a microactuator (e.g., 128) configured to move and/or position the transducer according to the feed-forward control signal, the feed-forward control signal being configured to apply a voltage to move the transducer in anticipation of the next track position based on a predefined seek profile. In various embodiments, the feed-forward control signal applied to the microactuator (e.g., 128) includes an output voltage different from a corresponding voltage value of the acceleration table. In various embodiments, the microactuator is piezoelectric, and the voltage at the microactuator corresponds to a movement and/or displacement of the transducer. In various embodiments, the velocity value and the position value are each derivable from a voltage at the microactuator. In various embodiments, the applied feed-forward control signal is configured to ensure a final acceleration value of substantially zero and a final velocity value of substantially zero at the transducer. The result can address or substantially eliminate undesirable wind-up effects on operation.

In various embodiments, the microactuator (e.g., 128) is positioned at a head or gimbal portion of a suspension supporting the transducer. In various embodiments, the microactuator is positioned at a loadbeam of a suspension supporting the transducer. In various embodiments, the microactuator includes a first and a second microactuator, where the first microactuator is positioned at a head or gimbal portion of a suspension supporting the transducer; and the second microactuator is positioned at a loadbeam of a suspension supporting the transducer, where the first and second microactuators are configured to cooperatively position the transducer relative to a target track on the disk.

Next, at step 1320, the method even further includes completing the data transfer operation on the current track during a period of latency in the movement toward the next track, such that a portion of the data transfer and a portion of the seek operation overlap in time.

Figure 5:
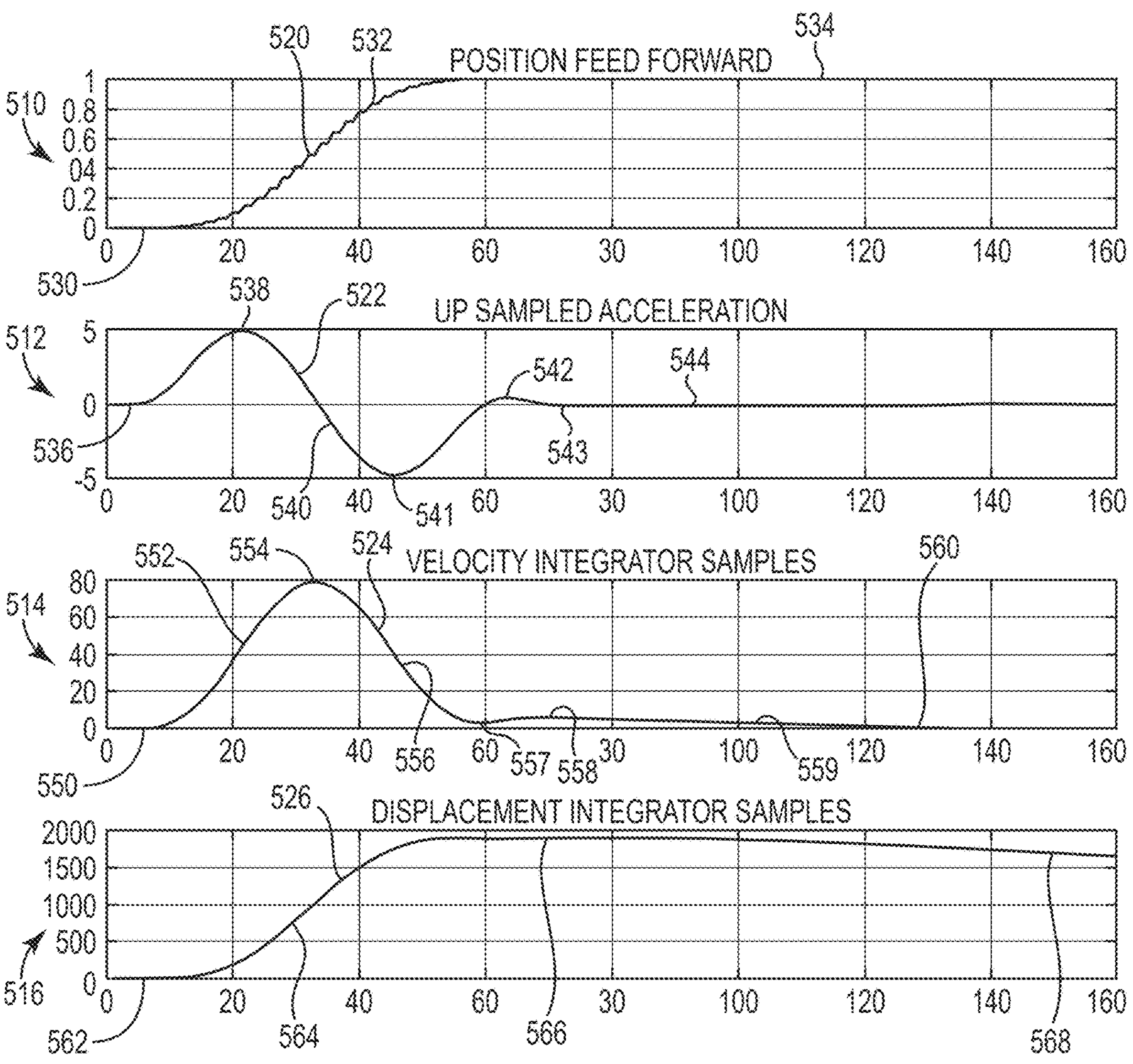
FIG. 5 shows various plots as a function of time for a single actuator movement, in accordance with certain aspects of the present disclosure.

FIG. 5 shows various plots as a function of time for a single microactuator 128 movement during a track switch operation, in accordance with certain aspects of the present disclosure, and in accordance with the method described with reference to FIG. 13. As shown, feed-forward values are parametrized based on acceleration data. For example, a double integral of an acceleration profile can give a displacement that is scaled to microactuator (e.g., DAC) voltages. By using such double acceleration integration, the feed-forward profile can be constrained to ensure that a final acceleration is zero, and that a final velocity is zero. Furthermore, utilizing an acceleration profile in this manner can result in a reduced or simplified servo adaptive parameter (SAP) memory footprint, e.g., 8-bit vs. 16-bit feed-forward granularity values. A resulting feed-forward value is a displacement value that is scaled by the microactuator gain and output to the microactuator DAC for implementation and control.

Figure 6:
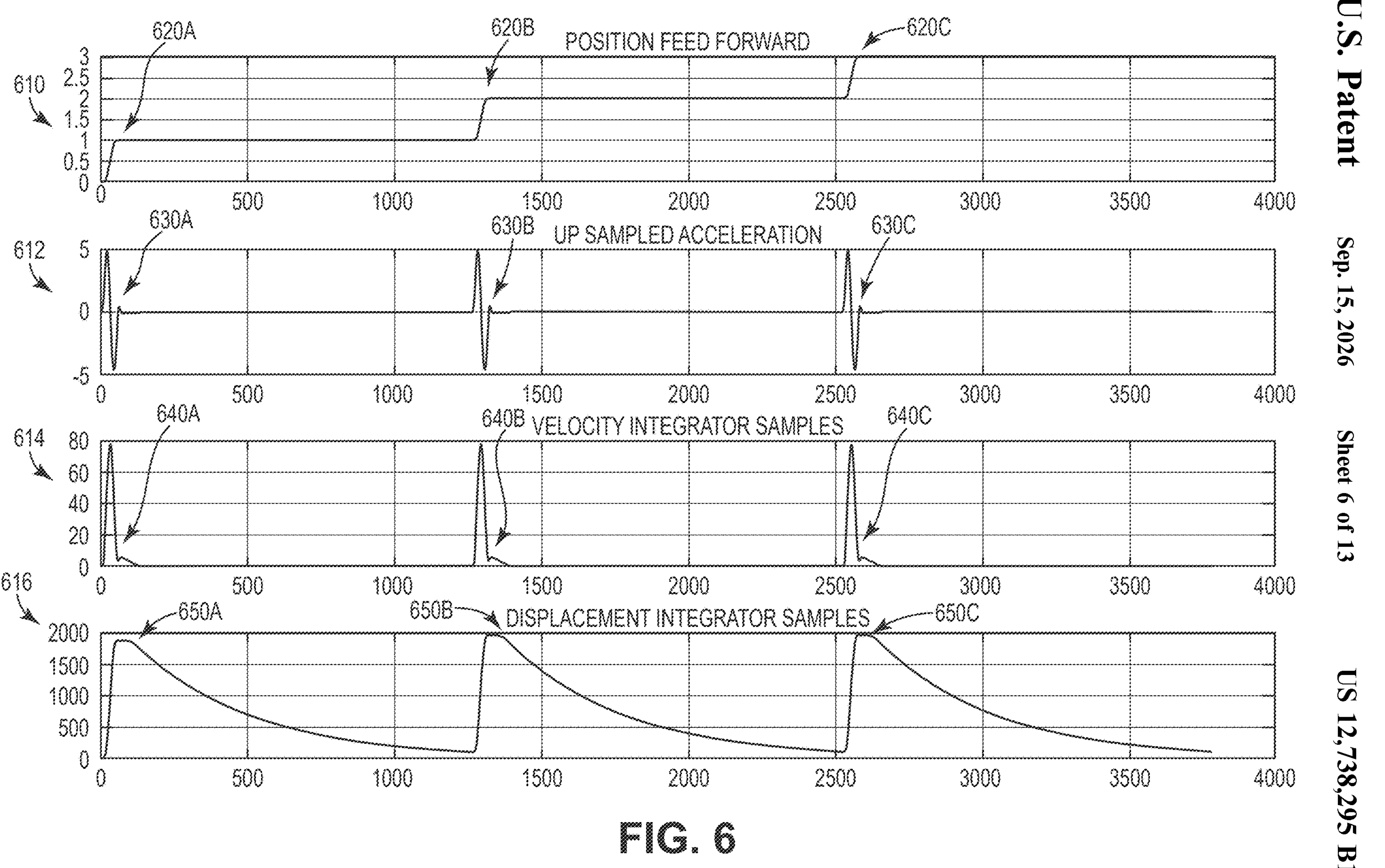
FIG. 6 shows various plots similar to FIG. 5 as a function of time for multiple sequential actuator movements, in accordance with certain aspects of the present disclosure.

Due to a physically limited stroke of the microactuator, the microactuator feed-forward voltage preferably returns to neutral over a revolution in preparation of a next track switch. A leaky gain (a floating point value slightly less than one, e.g. 0.995) for the displacement integrator allows the microactuator DAC to decay toward zero over time (as shown in FIG. 6 at 616). Alternatively, various forms of a feed-forward table in memory can be utilized to return the microactuator (e.g., 128) to neutral during one disk revolution. The displacement integrator leaky gain approach has been found to be beneficially memory-efficient, since a single gain value (or small number of gain values) are to be stored in memory. The servo processor may utilize a displacement integrator gain scheduling algorithm to select one of a limited number of gain values memory (as a function of time), where typical gains have a value slightly less than one. Furthermore, displacement integrator saturation can be added to address conditions that can lead to potential windup, including back-to-back track switches. A displacement integrator saturation limit can be chosen to leave some limited microactuator DAC margin for the tracking feedback controller. Under normal conditions, sequential seeks are issued one revolution apart, which can address undesired saturation aspects.

Still with reference to FIG. 5, and for an example ATS feed-forward control loop for improving seek performance and precision by predicting actuator behavior, four interrelated plots are shown. The four plots include a position feed-forward plot 510, an upsampled acceleration plot 512, a velocity integrator samples plot 514, and a displacement integrator samples plot 516. Of note, embodiments of the present disclosure can omit a plot or reference for VCM current, and rely instead of acceleration-derived data.

As shown, the position feed-forward plot 510 of a position feed-forward signal 520, which represents a desired microactuator position over time, generated in advance to preemptively guide the microactuator toward the next target track. The position feed-forward plot 510 is part of a feed-forward control approach, aiming to reduce reliance on reactive feedback. The position feed-forward plot 510 incorporates motion profiles for fast and precise seeks, and as described herein, is preferably derived from desired displacement, velocity, and/or acceleration parameters. As shown, the position feed-forward signal 520 starts at position zero, and increases along section 532 over time, until reaching a substantially steady state position at 534. The position feed-forward signal 520 is also shown with discrete steps since the position input is a single rate signal (not upsampled as the output displacement DAC signal is).

Next, an upsampled acceleration plot 512 of an upsampled acceleration signal 522 is shown. This plot 512 shows an observed acceleration profile at a high temporal resolution, and preferably upsampled from a lower-rate resolution. The upsampled acceleration plot 512 defines how the actuator is observed to accelerate at each moment in the seek. This can correlate to a representation of the second derivative of the position feed-forward signal, or conversely, the position feed-forward signal can correlate to a representation of the second integral of the upsampled acceleration plot 512. As described below, upsampling helps in modeling high-frequency dynamics more accurately, enabling finer control of actuator (e.g., microactuator 128) motion. Although only one line is shown for the multi-rate acceleration samples, it is understood that multiple lines/samples are also contemplated. In more detail, the upsampled acceleration signal 522 starts at zero acceleration at position 536, increases to a relative maximum positive acceleration at 538, falls at 540 towards a relative maximum negative acceleration at 541, before rebounding to a positive acceleration value at relative maximum 542, before falling at position 543, and then reaching substantially steady-state at position 544.

At 514 is shown a velocity integrator signal 524 from one or more velocity integrator samples. These samples show the integrated values of the acceleration plot 512 over time, The velocity integrator samples provide a velocity profile of the microactuator during the seek operation, and can be used for dynamic compensation or as predictive inputs to servo control aspects. As shown, the example velocity integrator signal 524 starts at a velocity of zero at 550 before increasing in velocity at 552 and reaching a velocity maximum 554 before falling in velocity at 556, and reaching relative minimum at 557, before increasing again at 558, reducing again at 559, and then eventually reaching substantially steady-state zero velocity at 560.

Finally, at 516 is a displacement integrator signal 526 from one or more displacement integrator samples. The displacement integrator samples at 516 show integrated values of the velocity samples of 514, showing the displacement or position of the microactuator over time. Preferably, at 516, the displacement (shown in units of microactuator voltage DAC counts) can substantially correlate to the position feed-forward signal 510 (shown in units of tracks), serving as a verification check for microactuator movement. As shown, the displacement integrator signal 526 starts at a minimum displacement value at 562, before increasing the displacement value at 564, and reaching a maximum displacement value at 566. The displacement integrator signal 526 then gradually falls as shown at 568.

FIG. 6 shows a set of plots similar to those of FIG. 5 as a function of time for multiple sequential actuator movements, in accordance with certain aspects of the present disclosure. FIG. 6 shows, e.g., the position feed-forward advancing multiple (three as shown) tracks from an arbitrary reference.

Three sequential actuator movements are shown for each of a position feed-forward 610, upsampled acceleration 612, velocity integrator samples 614, and displacement integrator samples 616. At the position feed-forward 610, three sequential seeks are shown at 620A, 620B, and 620C. At the upsampled acceleration 612, the same three sequential seeks are shown at 630A, 630B, and 630C. At the velocity integrator samples 614, the same three sequential seeks are shown at 640A, 640B, and 640C. At the displacement integrator samples 616, the same three sequential seeks are shown at 650A, 650B, and 650C. As shown, the position feed-forward signal at plot 610 gradually steps up at each seek, while, the signals at the upsampled acceleration and velocity integrator 612, 614 signals approach zero after each seek is complete. As shown in plot 616, the displacement integrator signal preferably substantially reaches zero after seek and prior to a subsequent seek operation.

With reference now in particular to FIGS. 7A-9, various upsampling and filtering steps, e.g., for application to a decimated acceleration table (e.g., 1400 of FIG. 14) for microactuator control, are shown and described. FIG. 7A describes a multi-rate upsampling process with finite impulse response (FIR) interpolation filtering, and FIG. 7B describes an alternative, similar upsampling process with infinite impulse response (IIR) low-pass filtering. As shown below, a microactuator feed-forward signal from a decimated table to a 2× multi-rate output can utilize a 4× upsampling process. As described below, various interpolation approaches can be utilized to obtain such a 2× multi-rate profile, such as finite impulse response interpolation or infinite impulse response low-pass interpolation.

With reference to FIGS. 7A and 8A, in HDD feed-forward control, FIR interpolation uses a finite impulse response filter to generate high-resolution actuator control signals beyond the servo system's base sample rate. During fast seeks or fine track-following, feed-forward control can anticipate motion and can apply corrections to the VCM and microactuator (e.g., piezoelectric).

A servo sample rate can be limited by sector passages, while corresponding microactuators can operate at higher bandwidths. To improve precision, the feed-forward signal, typically computed once per sector, can be interpolated to a higher rate. FIR filters interpolate actuator position or force smoothly using weighted sums of past samples, with no feedback and linear phase, ensuring accurate timing. This can reduce aliasing and distortion, can match actuator dynamics, and can improve positioning, mimicking higher-rate control without faster sensing. Thus, FIR interpolation can enable precise microactuator feed-forward control by converting low-rate commands into high-resolution inputs aligned with actuator bandwidth.

FIR interpolation can be used in a multi-rate signal chain to deliver high-resolution feed-forward signals to HDD microactuators (e.g., 128) without excessive computation. Because microactuators require faster control than the servo sample rate (typically set by sector timing), a multi-rate approach is beneficial. For example, starting with a half-rate signal (e.g., acceleration/velocity/displacement computed every two sectors) can be followed by an upsampling including inserting zeros between samples. Then, FIR interpolation can be applied to reconstruct a smooth signal at the full servo rate. As contemplated herein, the upsampling steps can be repeated to achieve a 2× rate, including applying another FIR filter for finer resolution. FIR filters can remove artifacts introduced by upsampling, preserve phase accuracy, and enable smooth, continuous control signals at high resolution. Optionally, an IIR low-pass filter is applied after the final FIR stage to suppress remaining high-frequency noise and match the actuator's bandwidth.

With the above understanding, at 700 is shown a multi-rate upsampling process that utilizes FIR interpolation. The process starts with a half rate signal at 701, which is upsampled at step 702. Following the signal upsampling at step 702, an FIR interpolation filter is applied at 703 to the upsampled signal from step 702. The result is a full-rate upsampled and FIR interpolated signal at step 704. Next, the process can be repeated for multi-rate upsampling, starting with upsampling the full-rate signal 704 at step 705, followed by another FIR interpolation at step 706, providing an output 2× multi-rate upsampled signal for application in various embodiments herein.

With reference now to FIG. 7B, in the context of HDD feed-forward microactuator control, an IIR low-pass filter is used to smooth or attenuate high-frequency components before applying it to the microactuator. IIR filters can be recursive filters that use both past inputs and past outputs, allowing sharper frequency cutoffs with fewer coefficients than FIR filters. As low-pass filters, IIR filters can pass low-frequency content while suppressing high-frequency noise or sharp transitions. In microactuator control, this can help smooth feed-forward commands computed at servo intervals, prevent excitation of high-frequency resonances, and/or suppress artifacts from quantization or FIR interpolation. Thus, A simple first-order IIR filter, by incorporating feedback, can react gradually to signal changes, effectively damping high-frequency noise or spikes.

Thus, IIR low-pass filters can be used in a multi-rate signal chain to efficiently generate high-resolution feed-forward signals for HDD microactuators. Like the FIR-based approach, an IIR-based method can start with a half-rate signal (e.g., acceleration/velocity/displacement computed every two sectors), then can perform two stages of upsampling and IIR filtering. The IIR filtering can include upsampling by inserting zeros between samples. Next, an IIR low-pass filter can be applied to smooth the signal and reconstruct missing values. Next, the process can repeat at least once to reach a 2× full servo rate, aligning with microactuator bandwidth. IIR filters can use both past inputs and outputs, enabling sharp low-pass behavior with fewer coefficients and lower latency than FIR filters. While non-linear phase may introduce some timing distortion, IIR filters are effective for smooth control where phase linearity is less critical. Such an IIR-based approach offers efficiency (low computation), compact filtering for anti-aliasing and smoothing, and/or fine-grained actuator control from low-rate inputs.

With the above understanding, at 710 is shown a multi-rate upsampling process that utilizes IIR interpolation. The process starts with a half rate signal at 711, which is upsampled at step 712. Following the signal upsampling at step 712, an IIR low-pass filter is applied at 713 to the upsampled signal from step 712. The result is a full-rate upsampled and IIR interpolated signal at step 714. Next, the process can be repeated for multi-rate upsampling, starting with upsampling the full-rate signal 714 at step 715, followed by another IIR low-pass filtering at step 716, providing an output 2× multi-rate upsampled signal for application in various embodiments herein.

FIGS. 8A and 8B show example frequency domain plots 800 and 810, respectively, that include an output of the 2 stages as a comparison for both the FIR and IIR methods, both at full-rate and multi-rate embodiments. As shown at plot 800 of FIG. 8A, a frequency response of upsampled, full-rate acceleration, in terms of low-pass and interpolation, are shown, and in plot 810 of FIG. 8B, a frequency response of upsampled, multi-rate acceleration, in terms of low-pass and interpolation, are shown.

Figure 9:
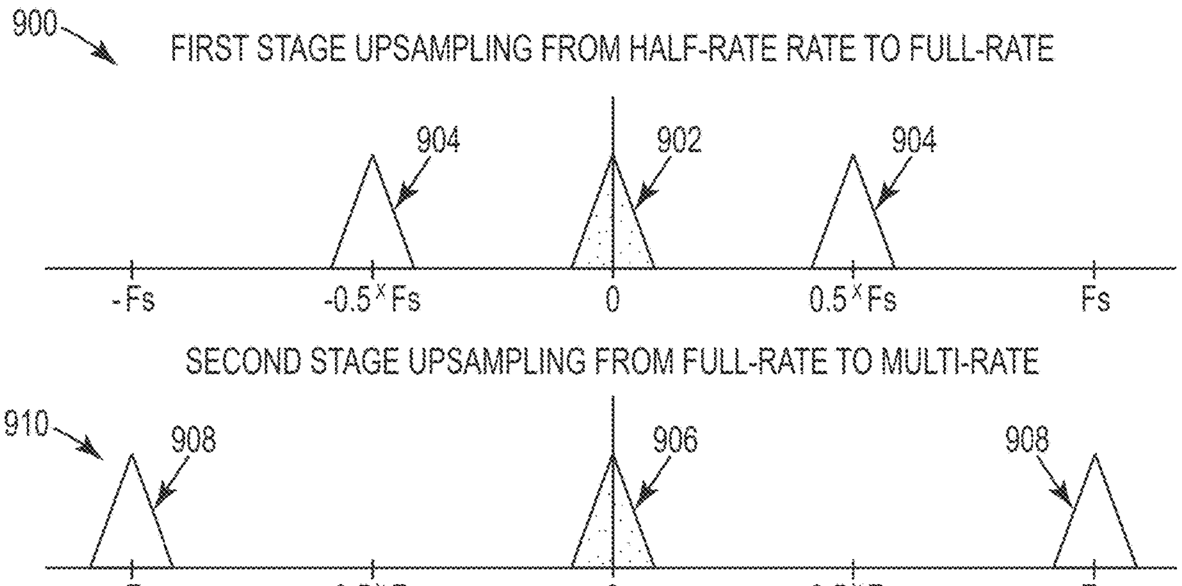
FIG. 9 shows a two-stage signal upsampling process, in accordance with certain aspects of the present disclosure.

FIG. 9 illustrates a two-stage multi-rate upsampling process for generating high-resolution feed-forward control signals, e.g., for use in a decimated acceleration table (e.g., 1400 of FIG. 14), in accordance with certain embodiments of the present disclosure. A first upsampling stage is shown at reference numeral 900, and a second upsampling stage is shown at reference numeral 910. In various embodiments, an ATS acceleration profile being upsampled can be bandlimited (e.g., to less than 6000 Hz) and can utilize a low-pass filter stop band at, e.g., 80-90% of the corresponding Nyquist frequency. In certain embodiments, the low-pass filter may include an IIR Butterworth filter (e.g., a biquadratic filter), which can include 50 dB attenuation near 90% of the corresponding Nyquist frequency, with 1 dB or less passband ripple up to 10% of the Nyquist frequency.

At the first stage 900, an input signal sampled at half the target rate is upsampled by a factor of two via zero-insertion. This operation introduces spectral images (or alias components), depicted at 904, at ±0.5 Fs, around the baseband signal centered at DC (0 Hz), shown at 902. A low-pass interpolation filter is then applied to suppress the spectral images at and reconstruct a smooth, full-rate version of the original signal.

At the second stage 910, the output of the first stage, now at full sample rate, is again upsampled by a factor of two, introducing additional spectral images at ±Fs, illustrated at reference numeral 908, while preserving the baseband signal centered at DC (reference numeral 906). A second low-pass filter is applied to remove these artifacts, resulting in a final high-resolution signal at a 2× upsampled rate. Optionally, the same filter coefficients may be used for both upsampling stages.

The use of two sequential upsampling stages, each followed by low-pass filtering, enables efficient reconstruction of a high-rate control signal from a lower-rate input. This two-stage interpolation architecture reduces computational complexity relative to single-stage designs, and is well suited for generating smooth, high-frequency feed-forward signals required by microactuators in hard disk drive systems.

Figure 10:
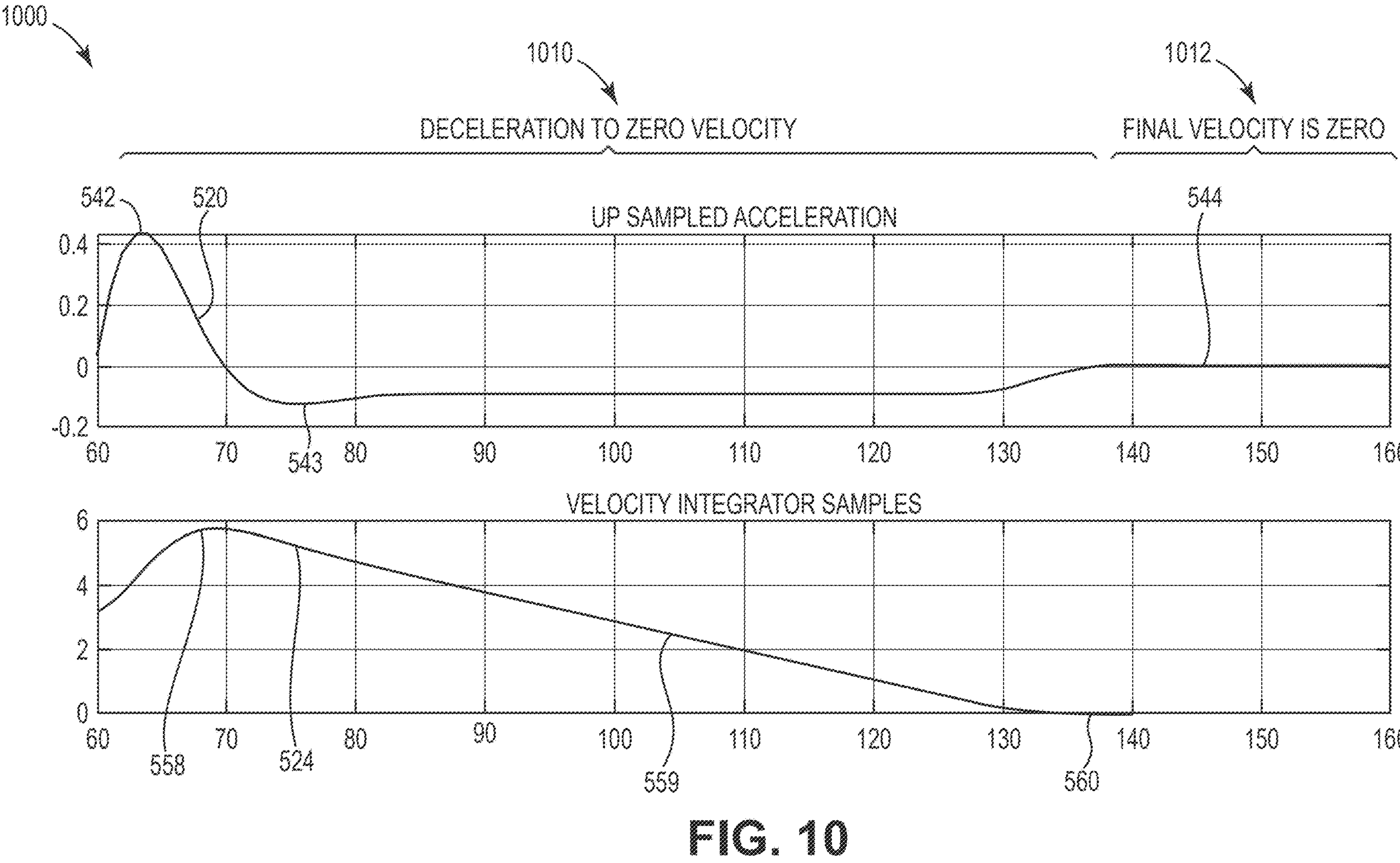
FIG. 10 shows a close-up view of a portion of FIG. 5, in accordance with certain aspects of the present disclosure.

FIG. 10 shows a close-up view 1000 of a portion of upsampled acceleration and velocity integrator samples plots of FIG. 5, in accordance with certain aspects of the present disclosure. As shown, the X-axis of the view 1000 includes units going from 60-160, whereas FIG. 5 includes units from 0-160. The corresponding Y-axis is also at a finer scale in FIG. 10.

It is understood herein that a preferred acceleration profile can result in a final velocity of zero, e.g., to prevent windup in the displacement integrator over time. It is also known that VCM current bias can be removed, e.g., by feedback control. For instance, the integral of the acceleration profile may be non-zero, resulting in a non-zero final velocity. For a given position profile trajectory and length, an acceleration feed forward table calibration can converge to a result that may have a non-zero final velocity, in part due to profile truncation in table memory.

As shown, reference numeral 1000 includes a deceleration to zero velocity section 1012, in which the upsampled acceleration signal 520 tends to zero, and a final velocity is zero section at 1012, in which the velocity integrator signal 524 can reach and hold substantially zero velocity, until and unless another seek action is requested.

Figure 11:
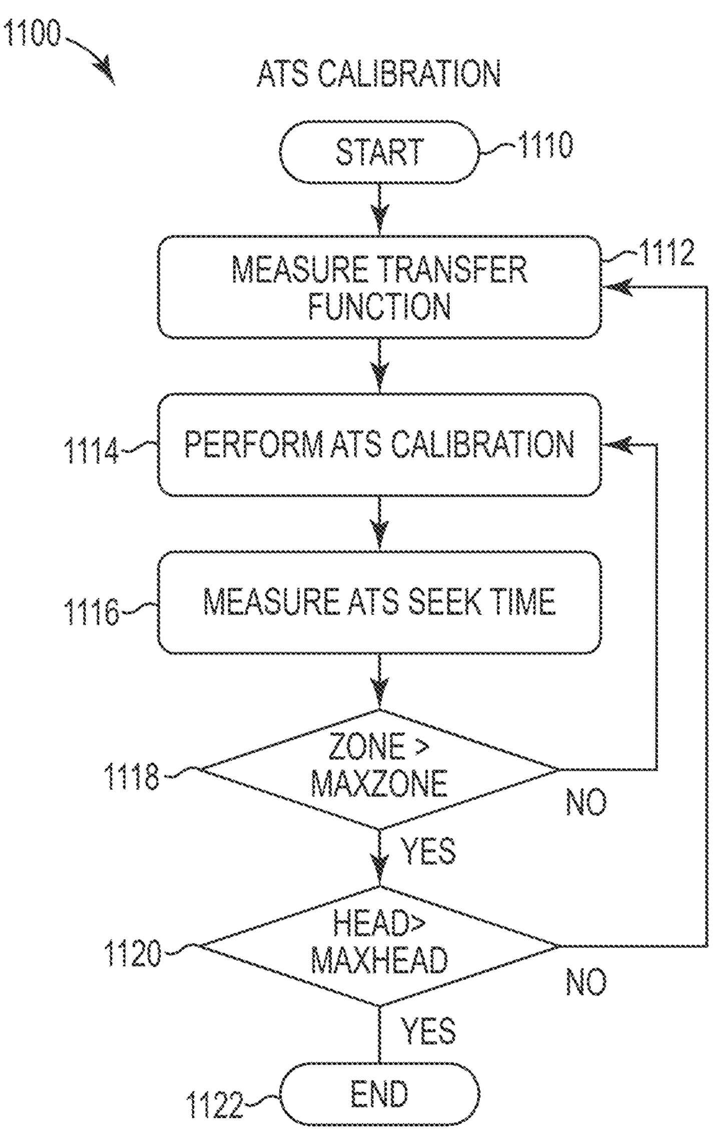
FIG. 11 shows a flowchart of an anticipatory track switch calibration method, in accordance with certain aspects of the present disclosure.
Figure 12:
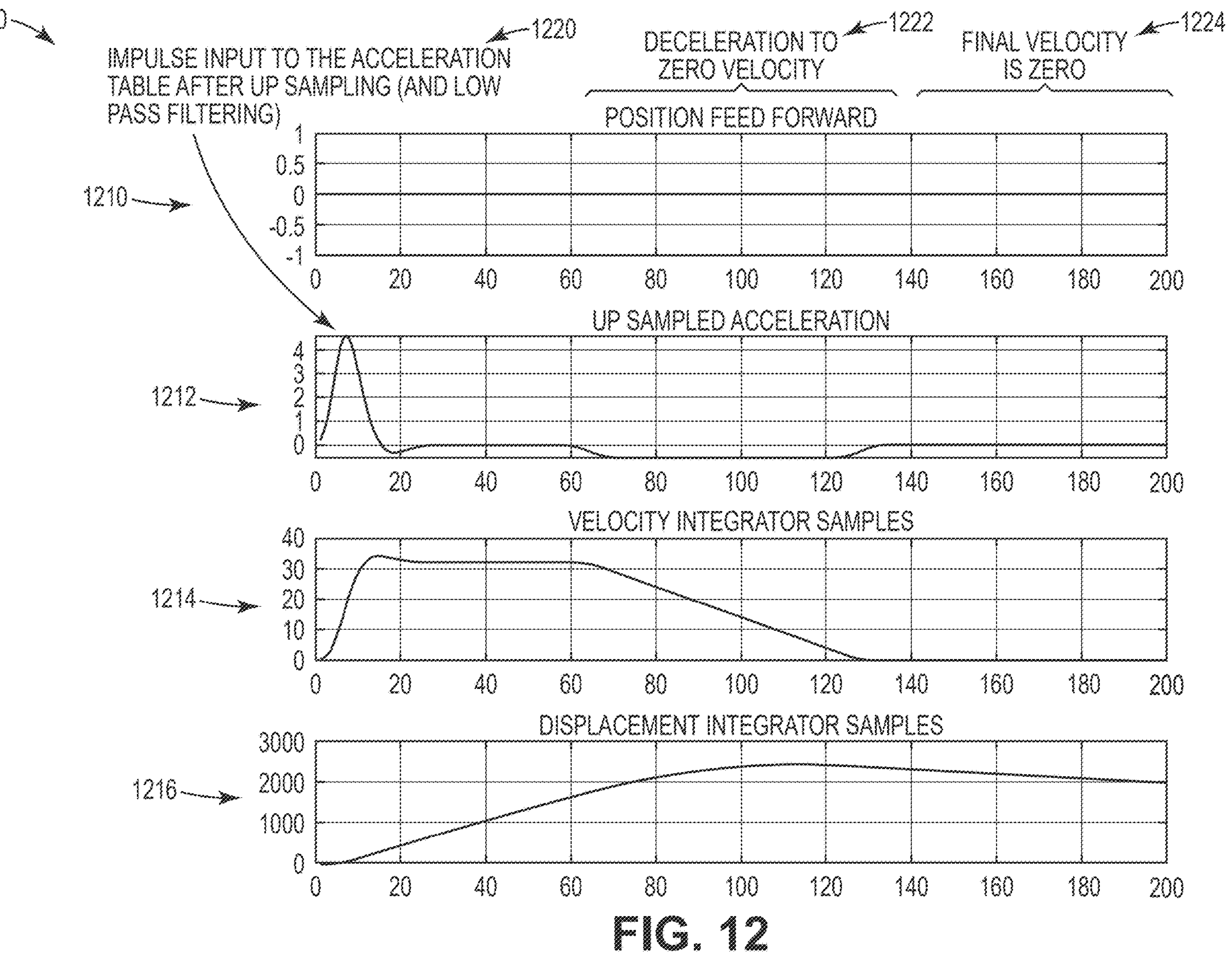
FIG. 12 shows various plots related to an impulse response input for calibration, in accordance with certain aspects of the present disclosure.

FIGS. 11 and 12 show various calibration steps and features configured to avoid or reduce microactuator windup and DAC saturation during calibration and HDD operation. As described above, parameterization allows for factory calibration using iterative learning control (ILC). The result can allow for lowering the OCLim while, e.g., keeping the track skew from previous iterations.

FIG. 11 shows a flowchart 1100 of an ATS calibration method, in accordance with certain aspects of the present disclosure.

An ATS calibration method begins at step 1110, then continues to step 1112 by measuring the transfer function of an actuator-head-disk system. This measurement at step 1112 can characterize the system's dynamic response and is essential for calibrating the seek control parameters. Once the transfer function is obtained, at step 1114 the system performs the ATS calibration using this data to optimize seek performance. Following calibration, at step 1116, the system measures the ATS seek time to assess the effectiveness of the adjustments. At step 1118, the process then evaluates whether additional calibration is needed for other disk zones. If the current zone number is less than the maximum zone, the process repeats for the next zone to step 1114. Once all zones for a given head have been calibrated, the system checks at step 1120 whether there are additional heads requiring calibration. If the current head number is less than the maximum head, the process repeats for the next head to 1112, beginning again with transfer function measurement. This loop can continue until calibration and seek time measurement have been completed for all heads and all zones, at which point the process ends at step 1122.

Additional calibration aspects and methods are also contemplated. For example, an ATS measure transfer function process for a head is described. The process begins by collecting baseline ATS Repeatable Runout (RRO) data over a defined number of seeks for a given head. Next, an impulse injection can be added to a servo adaptive parameter (SAP) ATS table to simulate a known disturbance in the system. Following this, the impulse response can be collected in the form of ATS RRO over another set of seeks. Once the response data has been gathered, the original SAP ATS table can be restored to its previous state. Finally, using both the impulse and the response data, the system can compute the ATS transfer function, completing the process.

For another example, an ATS calibration process for a head/zone is described. A calibration loop can begin by collecting ATS RRO data over a number of seeks for a specific head/zone. The system then reports the maximum absolute RRO observed. If this maximum value exceeds a predefined limit, correction values are computed for the ATS table, e.g., using a model-based iterative learning control (ILC) technique. These corrections are then added to the SAP ATS table to improve system accuracy. The process then can repeat to re-evaluate the updated parameters. If the maximum absolute RRO is within acceptable limits, no corrections are made and the process ends for that zone.

FIG. 12 shows various plots at reference numeral 1200 related to an impulse response input for calibration (see also description above), in accordance with certain aspects of the present disclosure. More specifically, an iterative learning solution to avoid microactuator saturation is shown and disclosed in FIG. 12.

Similar to FIGS. 5 and 10, various plots are shown at 1200, including a position feed-forward plot 1210, an upsampled acceleration plot 1212, a velocity integrator sample plot 1214, and a displacement integrator sample plot 1216. Also shown are various stages across the plots, including an impulse input to an acceleration table (e.g., 1400 of FIG. 14) after up-sampling and low-pass filtering at 1220. Next, is a deceleration to zero velocity section at 1222. Finally, a final velocity is zero section 1224 is shown. In FIG. 12, the vertical axis can represent DAC counts, which can be converted to voltage.

As shown at 1220, an impulse input example is shown, e.g., a time impulse response for an microactuator ATS operation. For example, an input of [1, 0, 0, 0, 0, . . . , 0] is provided as a vector input to the acceleration table for measuring a transfer function. The deceleration to zero velocity phase can prevent the subject microactuator (e.g., 128) from saturating, as discussed herein.

As shown an impulse is used in a test case, which is visible in the multi-rate acceleration samples. Following the impulse, an ATS zero velocity deceleration part 1222 is shown, which avoids displacement integrator saturation and is negative to cancel out the residual velocity due to the impulse (i.e., impulse response). Zero velocity deceleration at 1222 allows an impulse response measurement to avoid integrator windup, as discussed above. Velocity over time tends to zero at 1224, and the displacement is shown as a swell that increases then falls off.

As described above, displacement integrator saturation can address potential impulse injections that may otherwise result in potential windup. A displacement integrator saturation limit can leave some limited margin for the tracking controller. FIG. 12 thus represents a test for monitoring for DAC saturation for control improvements and windup removal in accordance with various embodiment of the present description.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method for positioning a transducer over a magnetic recording medium for sequential track seeking operations, comprising:

performing a data transfer operation on a current track of the magnetic recording medium using the transducer;

during the data transfer operation, identifying a next track to which the transducer is to be moved in accordance with a sequential access pattern;

initiating movement of the transducer toward the next track before completion of the data transfer operation on the current track;

determining a feed-forward control signal based on a feed-forward profile comprising an acceleration table;

applying the feed-forward control signal to a microactuator configured to move and/or position the transducer according to the feed-forward control signal, the feed-forward control signal being configured to apply a voltage to move the transducer in anticipation of the next track position based on a predefined seek profile; and completing the data transfer operation on the current track during a period of latency in the movement toward the next track, such that a portion of the data transfer and a portion of the seek operation overlap in time.

2. The method of claim 1, wherein the feed-forward control signal is determined based on the feed-forward profile according to at least one of a) a velocity value determined based on a first integral of an acceleration value of the acceleration table, or b) a position value determined based on a second integral of the acceleration value of the acceleration table.

3. The method of claim 2, wherein the microactuator is piezoelectric, and wherein the voltage at the microactuator corresponds to a movement and/or displacement of the transducer.

4. The method of claim 3, wherein the acceleration table associates discrete voltage values with corresponding microactuator acceleration values.

5. The method of claim 3, wherein the velocity value and the position value are each derivable from a voltage at the microactuator.

6. The method of claim 1, wherein the applied feed-forward control signal is configured to ensure a final acceleration value of substantially zero and a final velocity value of substantially zero at the transducer.

7. The method of claim 1, wherein the microactuator is positioned at a head or gimbal portion of a suspension supporting the transducer.

8. The method of claim 1, wherein the microactuator is positioned at a loadbeam of a suspension supporting the transducer.

9. The method of claim 1, wherein the microactuator comprises a first and a second microactuator, wherein:

the first microactuator is positioned at a head or gimbal portion of a suspension supporting the transducer; and the second microactuator is positioned at a loadbeam of a suspension supporting the transducer, wherein the first and second microactuators are configured to cooperatively position the transducer relative to a target track on the disk.

10. The method of claim 1, wherein the acceleration table is a decimated acceleration table.

11. The method of claim 10, wherein the decimated acceleration table is upsampled.

12. The method of claim 1, wherein the feed-forward control signal applied to the microactuator comprises an output voltage different from a corresponding voltage value of the acceleration table.

13. A data storage device, comprising:

a disk configured to store data in a plurality of concentric data tracks;

a head configured to read data from or write data to the data tracks;

an actuator configured to move the head radially across the disk; and a control circuit for positioning a transducer over a magnetic recording medium for sequential track seeking operations, the control circuit configured to:

perform a data transfer operation on a current track of the magnetic recording medium using the transducer;

during the data transfer operation, identify a next track to which the transducer is to be moved in accordance with a sequential access pattern;

initiate movement of the transducer toward the next track before completion of the data transfer operation on the current track;

determine a feed-forward control signal based on a feed-forward profile comprising an acceleration table associating discrete voltage values with corresponding microactuator acceleration values;

apply the feed-forward control signal to a microactuator configured to move and/or position the transducer according to the feed-forward control signal, the feed-forward control signal being configured to apply a voltage to move the transducer in anticipation of the next track position based on a predefined seek profile; and complete the data transfer operation on the current track during a period of latency in the movement toward the next track, such that a portion of the data transfer and a portion of the seek operation overlap in time.

14. The data storage device of claim 13, wherein the feed-forward control signal is determined based on the feed-forward profile according to at least one of a) a velocity value determined based on a first integral of an acceleration value of the acceleration table, or b) a position value determined based on a second integral of the acceleration value of the acceleration table.

15. The data storage device of claim 14, wherein the microactuator is piezoelectric, wherein the voltage at the microactuator corresponds to a movement and/or displacement of the transducer, and wherein the velocity value and the position value are each derivable from a voltage at the microactuator.

16. The data storage device of claim 13, wherein the applied feed-forward control signal is configured to ensure a final acceleration value of substantially zero and a final velocity value of substantially zero at the transducer.

17. The data storage device of claim 13, wherein the acceleration table is a decimated acceleration table.

18. The data storage device of claim 17, wherein the decimated acceleration table is upsampled.

19. The data storage device of claim 13, wherein the feed-forward control signal applied to the microactuator comprises an output voltage different from a corresponding voltage value of the acceleration table.

20. A non-transitory computer-readable medium storing instructions which, when executed by a controller of a data storage device, cause the data storage device to position a transducer over a magnetic recording medium for sequential track seeking operations, including the steps of:

performing a data transfer operation on a current track of the magnetic recording medium using the transducer;

during the data transfer operation, identifying a next track to which the transducer is to be moved in accordance with a sequential access pattern;

initiating movement of the transducer toward the next track before completion of the data transfer operation on the current track;

determining a feed-forward control signal based on a feed-forward profile comprising an acceleration table associating discrete voltage values with corresponding microactuator acceleration values;

applying the feed-forward control signal to a microactuator configured to move and/or position the transducer according to the feed-forward control signal, the feed-forward control signal being configured to apply a voltage to move the transducer in anticipation of the next track position based on a predefined seek profile; and completing the data transfer operation on the current track during a period of latency in the movement toward the next track, such that a portion of the data transfer and a portion of the seek operation overlap in time.

* * * * *